G. FRIEDMAN.
BREAD MIXER.
APPLICATION FILED MAY 5, 1909.
960,878.
Patented June 7, 1910.
2 SHEETS—SHEET 1.
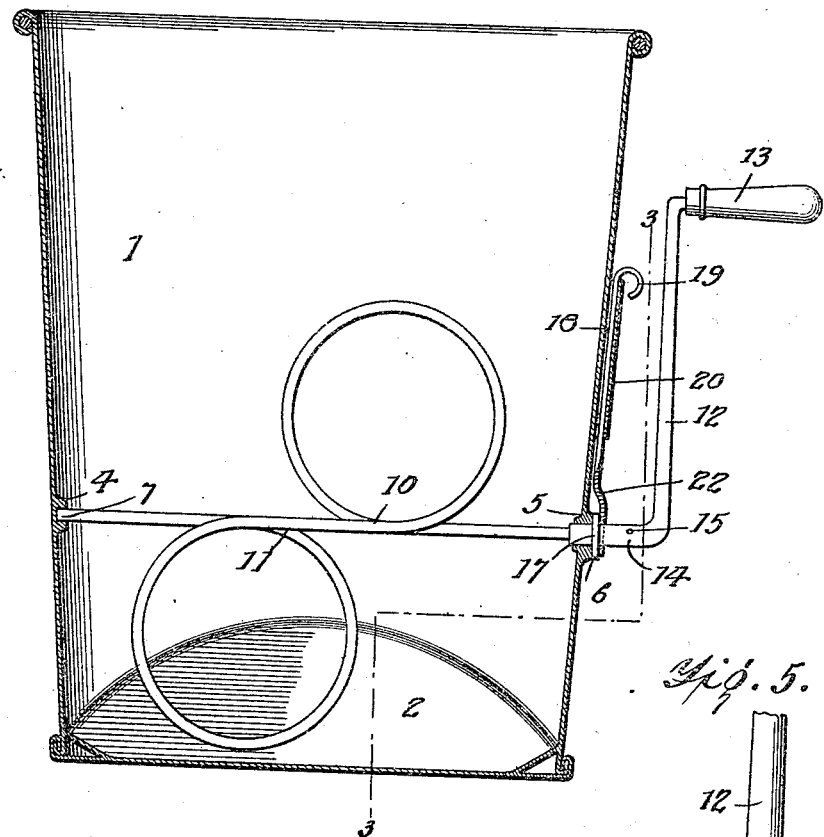
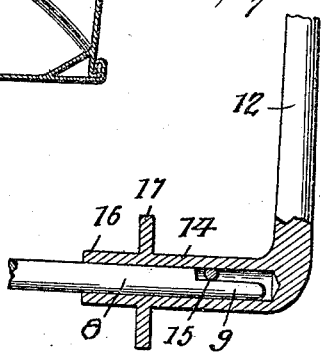
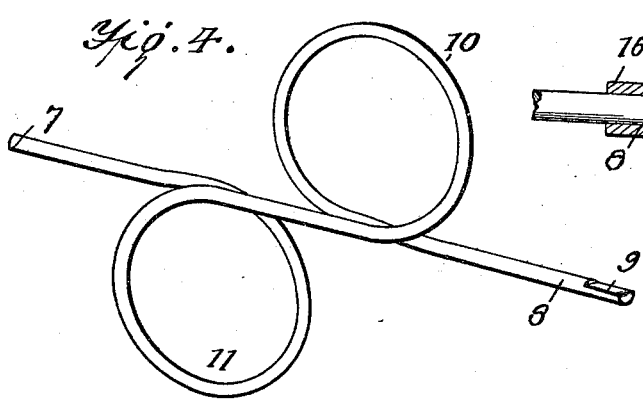
Witnesses
J. H. Schmidt.
A. M. Whitmore.
Inventor
Joste Friedman,
By E. B. Whitmore,
Attorney G. FRIEDMAN.
BREAD MIXER.
APPLICATION FILED MAY 5, 1909.
960,878.
Patented June 7, 1910.
2 SHEETS—SHEET 2.
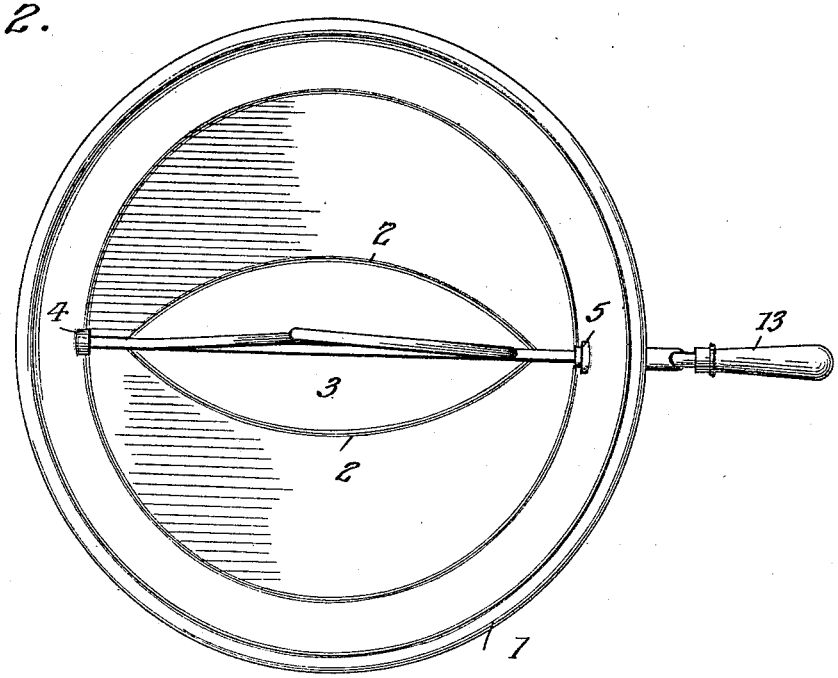
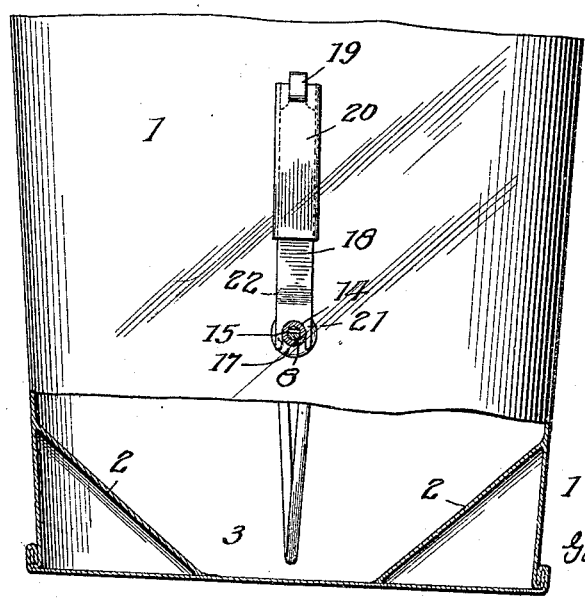

UNITED STATES PATENT OFFICE.

GOSTE FRIEDMAN, OF JAMESTOWN, NEW YORK.

BREAD-MIXER.

960,878. Specification of Letters Patent. Patented June 7, 1910.

Application filed May 5, 1909. Serial No. 494,131.

*To all whom it may concern:*

Be it known that I, GOSTE FRIEDMAN, of Jamestown, in the county of Chautauqua and State of New York, have invented a new and useful Improvement in Bread-Mixers, which improvement is fully set forth in the following specification and shown in the accompanying drawings.

This invention relates to certain new and useful improvements in bread mixers and it has for its objects among others to provide a simplified and improved construction of mixer involving a peculiar form of dasher or stirrer, means for holding the same against displacement and also simple yet efficient means for holding the crank to the shaft of the dasher.

Other objects and advantages of the invention will hereinafter appear and the novel features thereof will be particularly pointed out by the appended claims.

The invention is clearly illustrated in the accompanying drawings, which, with the numerals of reference marked thereon, form a part of this specification, and in which—

Figure 1 is a substantially central vertical section through a bread mixer constructed in accordance with my present invention. Fig. 2 is a top plan thereof. Fig. 3 is a detail, partly in elevation and partly in section, the same being taken as on the line 3—3 of Fig. 1. Fig. 4 is a perspective view of the dasher removed. Fig. 5 is an enlarged detail, partly in elevation and partly in section, with portions broken away, showing the coöperating portion of the dasher shaft and crank.

Like numerals of reference indicate like parts throughout the several views.

Referring to the drawings, 1 designates the vessel or receptacle of any suitable material, shape and capacity, preferably, however, of the form seen in Figs. 1, 2 and 3. The bottom of the vessel or receptacle is tapered from opposite sides, as seen at 2—2, the taper being so disposed that the depression 3 formed thereby shall be disposed longitudinally substantially in a vertical plane axially with the shaft of the dasher, as will be readily understood upon reference to Figs. 2 and 3, whereby the dasher in its movements follows the path in quite close proximity to the bottom of the vessel formed by the two tapered sides and the bottom proper of the vessel therebetween so that the entire contents may be acted upon by the dasher.

The vessel or receptacle is provided at a suitable point, in this instance, at about one-third of the height from the bottom, with a closed bearing 4 upon one side and an open bearing 5 at the diametrically opposite side, as seen clearly in Figs. 1 and 2. The open bearing is reinforced or strengthened exteriorly, as at 6, so as to give the requisite rigidity.

The dasher or stirrer is mounted in these bearings. This dasher is formed of a single piece of material, preferably round wire, of the requisite size and strength, one end thereof forming the pintle 7 which is received within the bearing 4 and the other end forming a pintle 8 received in the bearing 5 and having a flattened side, as shown at 9 in Figs. 4 and 5. Between its ends, the dasher is provided with the double reverse curved portions 10 and 11 in the form of complete closed loops, as shown best in Figs. 1 and 4, the same being formed by coils of the wire or material of which the same is composed, the curved portions being in substantially the same plane, the two terminal bearing portions extending in substantially the same plane, as seen best in Figs. 1, 2 and 4.

12 is the crank having a suitable handle 13 at one end and at the other having a hollow right angled portion 14 within which the end of the pintle 8 of the dasher is received. This hollow portion has extending therethrough within the same a tangent pin 15 for coaction with the flattened side of the pintle 8, as seen clearly in Fig. 5. The extreme inner end of the hollow portion of the crank forms a hollow bearing 16 received within the bearing 5, and adjacent thereto is the annular flange or collar 17 which is designed to bear against the outer face of the enlargement 6 of said bearing 5, as will be evident from Fig. 1. When the crank is put in place on the mixer, it occupies the plane of the double reverse curves or loops of the mixer, the whole being in the same plane, as will be evident from Figs. 1 and 2. The crank is engaged by simply placing it in its proper position with relation to the end of the dasher stem or shaft and then inserting the latter into the hollow member of the crank, when the pin rides on the flattened face of the end of the stem and rotation of the crank serves to revolve the dasher on its bearings.

In order to hold the crank in place, I provide a slide 18 having a suitable handle portion 19, said slide being mounted for movement and guided in a suitable guide 20 secured to the outer wall of the vessel 1 and having its lower end bifurcated, as seen at 21, to receive the adjacent part of the crank, the slide being slightly offset near its lower end, as at 22, so that the branches of the slide will come outside of the flange or collar 17 of the crank.

In assembling the parts, the flattened end of the dasher is inserted from the inside of the vessel and projected outwardly through the bearing 5 and the other end 7 then engaged in the bearing 4. The crank is then slipped on to the projecting end of the pintle 8 of the stem of the dasher and the slide 18 pressed down until its bifurcated end engages over the adjacent portion of the hollow member 14 of the crank, as seen in Figs. 1 and 3, engaging the outer face of the flange or collar 17 on said hollow portion and pressing the same against the outer face of the enlargement 6 of the bearing 5, thus locking the parts together and preventing displacement of the crank or dasher.

The operation will be apparent from the foregoing description, when taken in connection with the annexed drawings, and a detailed description thereof is not deemed necessary.

What is claimed as new is:—

1. In a bread mixer, a dasher formed of one continuous piece of material having pintles at the ends and intermediate double reverse complete closed loops, one of said pintles having a flattened side, combined with a crank having a hollow portion to receive the pintle and a tangent pin to engage said flattened side.

2. In a bread mixer, the combination with a vessel having bearings, of a dasher having its ends received in said bearings, one end projecting through its bearing and having a flattened portion, a crank having a hollow portion and tangent pin to receive said projecting end and engage its flattened portion, and an exterior collar, and a slide mounted on the exterior of the vessel and having bifurcated end to receive said hollow portion and engage said flange.

3. In a bread mixer, the combination of a vessel and a dasher having bearings therein with one end projected and flattened, a crank having a tubular portion receiving said projecting end, a tangent pin extending transversely through said tubular portion to coact with said flattened portion, said tubular portion having a hollow bearing at its inner end and an annular flange adjacent thereto.

4. In a bread mixer, the combination with a vessel and a dasher having bearings therein with one end projected and flattened, a crank having a tubular portion receiving said projecting end and an annular flange bearing against the outer face of the adjacent bearing and a hollow bearing received within said bearing, a tangent pin passed through said tubular portion between the inner wall thereof and the flattened portion of the extended bearing of the dasher, and a vertically movable slide having an offset portion near its lower end and branches engaging the tubular portion of the crank and bearing against its annular flange.

In witness whereof, I have hereunto set my hand this 28th day of April, 1909, in the presence of two subscribing witnesses.

GOSTE FRIEDMAN.

Witnesses:
W. E. ANDRUSS,
A. FRIEDMAN.